US012124343B1

(12) United States Patent
Goel et al.

(10) Patent No.: US 12,124,343 B1
(45) Date of Patent: Oct. 22, 2024

(54) HIGH AVAILABILITY MANAGEMENT FOR CLOUD INFRASTRUCTURE

(71) Applicant: Dell Products L.P., Round Rock, TX (US)

(72) Inventors: Naman Goel, Bangalore (IN); Ravishankar Kanakapura Nanjundaswamy, Bangalore (IN); Tulika Srivastava, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/360,020

(22) Filed: Jul. 27, 2023

(51) Int. Cl.
*G06F 11/20* (2006.01)
(52) U.S. Cl.
CPC ................... *G06F 11/2005* (2013.01)
(58) Field of Classification Search
CPC .................................................. G06F 11/2005
See application file for complete search history.

(56) References Cited

U.S. PATENT DOCUMENTS

| | | | | |
|---|---|---|---|---|
| 11,994,975 | B2 * | 5/2024 | White | G06F 11/366 |
| 2006/0112297 | A1 * | 5/2006 | Davidson | G06F 11/2005 |
| | | | | 714/E11.076 |
| 2017/0093613 | A1 * | 3/2017 | Albrecht | H04L 41/0668 |
| 2018/0203768 | A1 * | 7/2018 | Huang | G06F 11/1441 |
| 2018/0232142 | A1 * | 8/2018 | Shekar | G06F 11/2046 |
| 2019/0394081 | A1 * | 12/2019 | Tahhan | H04L 41/122 |
| 2020/0007408 | A1 * | 1/2020 | Siddappa | H04L 41/147 |
| 2023/0110856 | A1 | 4/2023 | Katiyar et al. | |
| 2023/0132992 | A1 * | 5/2023 | Bernat | G06F 9/505 |
| | | | | 709/201 |

(Continued)

FOREIGN PATENT DOCUMENTS

| | | | | |
|---|---|---|---|---|
| WO | WO-2017120500 A1 * | 7/2017 | | G06F 1/30 |
| WO | WO-2022251004 A1 * | 12/2022 | | G06F 11/0721 |

OTHER PUBLICATIONS

"IEEE Standard Test Method for Use in the Evaluation of Message Communications Between Intelligent Electronic Devices in an Integrated Substation Protection, Control and Data Acquisition System," in IEEE Std C37.115-2003 , vol. No., pp. 1-82, Jun. 30, 2004 (Year: 2004).*

(Continued)

*Primary Examiner* — Kamini B Patel
*Assistant Examiner* — Indranil Chowdhury
(74) *Attorney, Agent, or Firm* — Ryan, Mason & Lewis, LLP

(57) ABSTRACT

An apparatus in an illustrative embodiment comprises at least one processing device including a processor coupled to a memory. The at least one processing device is configured to detect a failure impacting management functionality associated with a management controller of a first network device. The at least one processing device is further configured, responsive to the detected failure being a failure of a first type, to address the detected failure utilizing at least one microservice replicated from the management controller to another component of the first network device, and responsive to the detected failure being a failure of a second type different than the first type, to address the detected failure by establishing an alternative management communication channel through at least one additional component of at least the first network device.

20 Claims, 9 Drawing Sheets

(56) References Cited

U.S. PATENT DOCUMENTS

| | | | |
|---|---|---|---|
| 2023/0176951 A1* | 6/2023 | Balaraman | G06F 11/2028 714/15 |
| 2023/0412676 A1* | 12/2023 | Cencini | H04L 67/1042 |
| 2024/0176739 A1* | 5/2024 | Alden | G06F 11/1658 |
| 2024/0236036 A1* | 7/2024 | Goel | H04L 61/5061 |

OTHER PUBLICATIONS

A. Ometov et al., "Multi-Factor Authentication: A Survey," Cryptography, vol. 2, No. 1, 2018, 31 pages.

Wikipedia, "Mulit-factor Authentication," https://en.wikipedia.org/wiki/Multi-factor_authentication, Sep. 5, 2021, 12 pages.

Averon, "Seamless MFA," https://averon.a2hosted.com/seamless-mfa/, Accessed Oct. 12, 2021, 7 pages.

M. D. Corner et al., "Zero-Interaction Authentication," Proceedings of the 8th Annual International Conference on Mobile Computing and Networking, Sep. 23-28, 2002, 11 pages.

Wikipedia, "Link Layer Discovery Protocol," https://en.wikipedia.org/wiki/Link_Layer_Discovery_Protocol, Jun. 14, 2022, 4 pages.

IEEE Standards Association, "IEEE Standard for Local and Metropolitan Area Networks—Station and Media Access Control Connectivity Discovery," IEEE Std 802.1AB-2016, Jan. 29, 2016, 146 pages.

Cisco Systems Inc., "Configuring DHCP Snooping," Cisco Nexus 7000 Series NX-OS Security Configuration Guide, Release 4.1, Chapter 15, https://www.cisco.com/c/en/us/td/docs/switches/datacenter/sw/4_1/nx-os/security/configuration/guide/sec_nx-os-cfg/sec_dhcpsnoop.html, Accessed Oct. 5, 2022, 20 pages.

Juniper Networks, Inc., "Understanding and Using Trusted DHCP Servers," https://www.juniper.net/documentation/us/en/software/junos/security-services/topics/topic-map/port-security-trusted-dhcp-server.html, Feb. 18, 2021, 6 pages.

R. Droms, "Dynamic Host Configuration Protocol," https://datatracker.ietf.org/doc/html/rfc2131, Network Working Group, Request for Comments: 2131, Mar. 1997, 45 pages.

Wikipedia, "Dynamic Host Configuration Protocol," https://en.wikipedia.org/wiki/Dynamic_Host_Configuration_Protocol, Dec. 29, 2022, 25 pages.

U.S. Appl. No. 18/094,442 filed in the name of Naman Goel et al., filed Jan. 9, 2023, and entitled "Secure and Dynamic Assignment of Network Addresses to Network Devices in an Information Processing System.".

U.S. Appl. No. 18/325,245 filed in the name of Naman Goel et al., filed May 30, 2023, and entitled "Authentication System for Cloud Infrastructure Using Keys Derived from Device Component Information.".

* cited by examiner

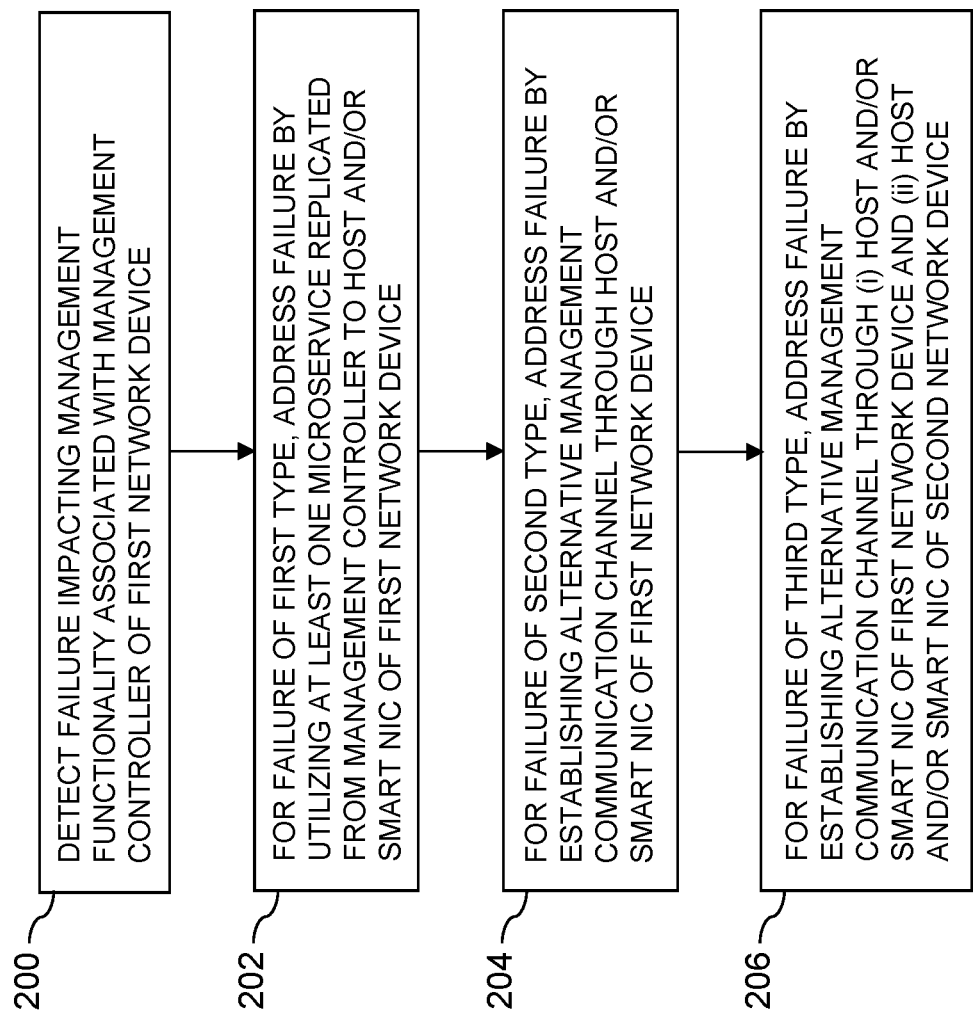

HIGH AVAILABILITY MANAGEMENT FOR CLOUD INFRASTRUCTURE

FIELD

The field relates generally to information processing systems, and more particularly to management techniques implemented in computer networks and other types of information processing systems.

BACKGROUND

In numerous cloud infrastructure deployments, including cloud and edge infrastructure arrangements, and in a wide variety of other computer network contexts, device management is particularly important. For example, cloud infrastructure arrangements typically include multiple distinct infrastructure resources, such as compute nodes, storage nodes, network switches and/or other types of network devices, at least some of which may be from the same infrastructure vendor. Such infrastructure resources can each have an associated management module. In the case of hyperconverged infrastructure (HCI), multiple infrastructure components typically interact with one another for management purposes via their respective management modules, which are additionally connected to one or more centralized management modules, illustratively provided by a cloud vendor or other infrastructure vendor. These and other similar cloud infrastructure arrangements can be vulnerable to failures that impact the management modules and/or their associated communication channels. A need therefore exists for improved management techniques that can avoid the above-noted failure vulnerability issues.

SUMMARY

Illustrative embodiments provide techniques for high availability management in a computer network, such as cloud infrastructure, cluster infrastructure or other deployments of information technology (IT) infrastructure. In some embodiments, the disclosed techniques advantageously avoid the above-noted failure vulnerability issues and other drawbacks associated with conventional practice.

In one or more embodiments, management functionality is implemented at least in part using information that is exchanged between nodes, network switches and other network devices, illustratively using Link Layer Discovery Protocol (LLDP) packets, although other types of packets could be used.

Some embodiments incorporate nodes or other devices that each include one or more instances of a baseboard management controller (BMC), as well as other types of devices such as one or more network switches, although it is to be appreciated that additional or alternative devices can be used in other embodiments. Such nodes, network switches and/or other devices are generally referred to herein as "network devices."

In an illustrative embodiment, an apparatus comprises at least one processing device that includes a processor coupled to a memory, with the at least one processing device being configured to detect a failure impacting management functionality associated with a management controller of a first network device. The at least one processing device is further configured, responsive to the detected failure being a failure of a first type, to address the detected failure utilizing at least one microservice replicated from the management controller to another component of the first network device, and responsive to the detected failure being a failure of a second type different than the first type, to address the detected failure by establishing an alternative management communication channel through at least one additional component of at least the first network device.

The management controller may comprise, for example, a BMC of the first network device, although other types of management controllers can be used.

In some embodiments, the failure of the first type illustratively comprises a failure relating to at least one microservice of the management controller, and addressing the detected failure of the first type comprises activating a version of the microservice replicated to at least one of a host and a smart network interface card of the first network device. Other types of smart components of the first network device can be used in place of or in addition to the host and/or smart network interface card.

Additionally or alternatively, the failure of the second type illustratively comprises a failure of a connection in a management network through which the management controller of the first network device communicates with at least one or more additional management controllers of one or more respective additional network devices. Such management controllers also illustratively communicate over the management network with at least one monitoring agent of a cloud management portal.

In such an embodiment, addressing the detected failure of the second type illustratively comprises establishing the alternative management communication channel through at least one of a host and a smart network interface card of the first network device.

In other embodiments, addressing the detected failure of the second type, or possibly a detected failure of a third type different than the second type, illustratively comprises establishing the alternative management communication channel through at least one of a host and a smart network interface card of the first network device and at least one of a host and a smart network interface card of a second network device.

Again, other types of smart components of at least one of the first network device and the second network device can be used in place of or in addition to the host and/or smart network interface card.

Numerous alternative arrangements involving other network devices and their associated components can be used to establish an alternative management communication channel in other embodiments.

In some embodiments, the management controller of the first network device illustratively identifies routes associated with packets of a plurality of different packet types processed by the first network device and stores corresponding route information in a repository for use in addressing the detected failure. For example, the packets of a first one of the different packet types may comprise respective LLDP packets exchanged between the first network device and one or more additional network devices. As another example, the packets of a second one of the different packet types may comprise respective management packets exchanged between the management controller of the first network device and at least one of (i) one or more additional management controllers of one or more respective additional network devices, and (ii) at least one monitoring agent of a cloud management portal.

These and other illustrative embodiments include, without limitation, systems, apparatus, methods and computer program products comprising processor-readable storage media.

BRIEF DESCRIPTION OF THE DRAWINGS

FIG. 2 is a flow diagram showing an example process for high availability management for cloud infrastructure in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
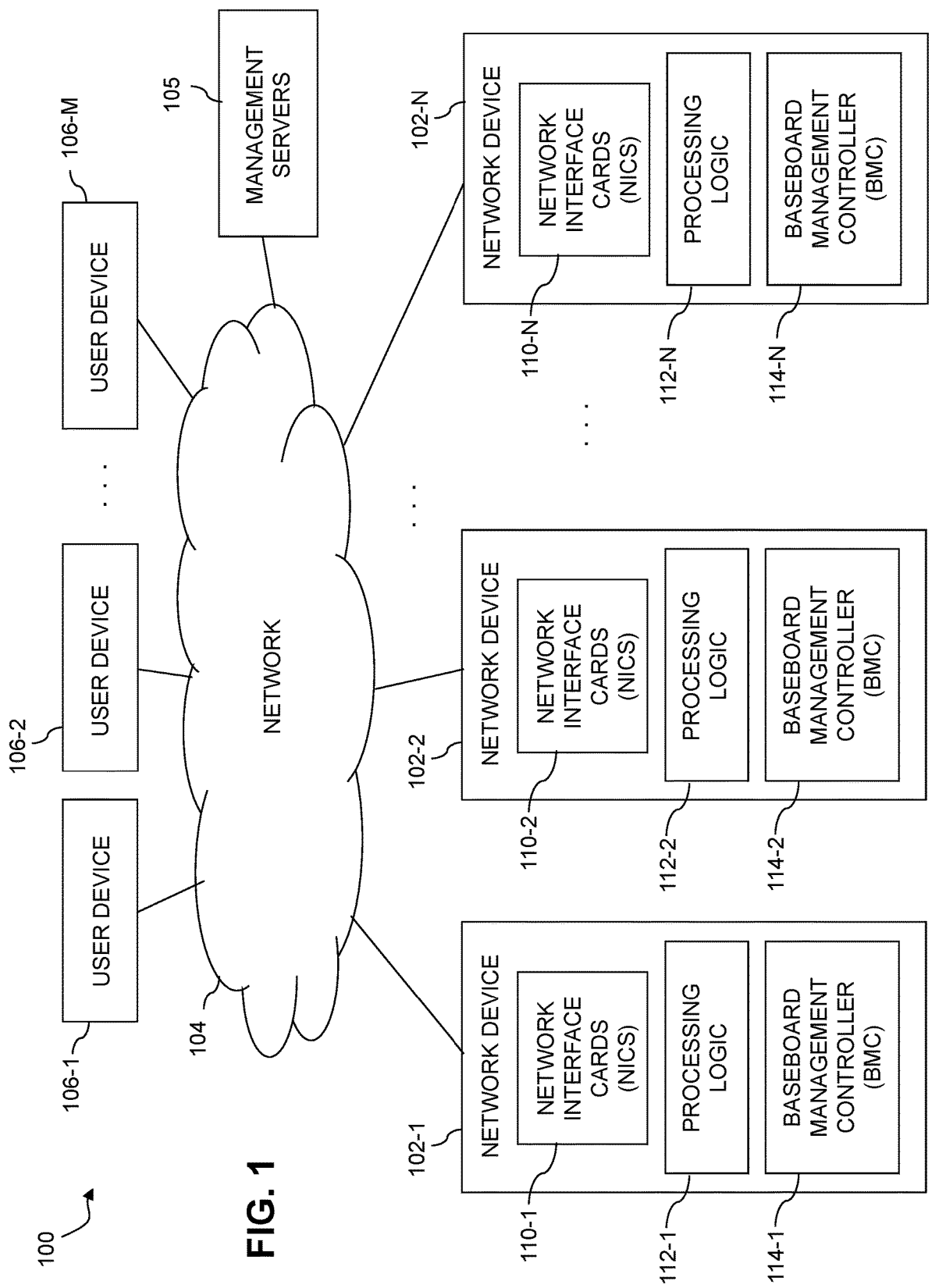
FIG. 1 is a block diagram of an example information processing system implementing high availability management for cloud infrastructure in an illustrative embodiment.

FIG. 1 shows an information processing system 100 configured to implement functionality for high availability management for cloud infrastructure in accordance with an illustrative embodiment. The information processing system 100 as shown comprises a plurality of network devices 102-1, 102-2 . . . 102-N, collectively referred to herein as network devices 102. The network devices 102 are coupled to a network 104, and in some embodiments may alternatively be viewed as comprising respective components of the network 104. The system 100 further comprises management servers 105 and a plurality of user devices 106-1, 106-2 . . . 106-M, with the user devices being collectively referred to herein as user devices 106. At least portions of the system 100 may be viewed as collectively comprising one or more computer networks.

The network devices 102 illustratively comprise respective sets of network interface cards (NICs) 110-1, 110-2, . . . 110-N, respective instances of processing logic 112-1, 112-2, . . . 112-N, and respective baseboard management controllers (BMCs) 114-1, 114-2 . . . 114-N, collectively referred to as respective NICs 110, processing logic 112 and BMCs 114. The processing logic 112 in some embodiments is implemented at least in part in respective hosts of the network devices 102. Such hosts, although not expressly shown in FIG. 1, may be viewed as examples of what are more generally referred to herein as "processing devices." In some embodiments, the NICs 110 are more particularly implemented as respective smart NICs, and each of at least a subset of network devices 102 may include one or more additional smart components, other than the smart NICs.

It should be noted that this particular example configuration of system components, such as network devices 102, network 104, management servers 105 and user devices 106, can be varied in other embodiments relative to the arrangement shown in FIG. 1. For example, in other embodiments, different arrangements, possibly including additional or alternative system components, can be used to implement the disclosed functionality for high availability management for cloud infrastructure.

A given one of the network devices 102 of system 100 may comprise, for example, a computer, a server, a host device, a storage system, or portions or combinations of these or other devices. Such network devices 102 are examples of what are more generally referred to herein as "processing devices." A given network device can therefore comprise one or more processing devices. In some embodiments, one or more of the network devices 102 may be implemented at least in part using cloud-based virtualization infrastructure such as a virtual machine or container. Network devices 102 can include, for example, various arrangements of physical nodes and/or virtual nodes. The term "network device" as used herein is therefore intended to be broadly construed, so as to encompass these and numerous other arrangements of one or more processing devices.

The network devices 102 in some embodiments comprise respective computers or servers associated with a particular company, organization or other enterprise. In addition, at least portions of the information processing system 100 may also be referred to herein as collectively comprising an "enterprise network." Numerous other operating scenarios involving a wide variety of different types and arrangements of processing devices and networks are possible, as will be appreciated by those skilled in the art.

A given one of the user devices 106 may comprise, for example, a mobile telephone, a laptop computer, a tablet computer, a desktop computer or another type of processing device from which one or more users can access system resources accessible via, or otherwise associated with, the network devices 102.

The user devices 106 are assumed to be associated with one or more users of the system 100. For example, such users can illustratively access protected resources of the system 100, such as protected resources of one or more of the network devices 102, by initiating a login procedure via one of the user devices 106. The term "user device" as used herein is intended to be broadly construed so as to encompass a wide variety of different types of processing devices or combinations of multiple such devices used to access network devices 102. A client system comprising multiple distinct processing devices may be considered a type of "user device" as that latter term is broadly used herein.

Also, it is to be appreciated that the term "user" in this context and elsewhere herein is intended to be broadly construed so as to encompass, for example, human, hardware, software or firmware entities, as well as various combinations of such entities.

Although multiple network devices 102, management servers 105 and user devices 106 are shown in the FIG. 1 embodiment, other embodiments can include single instances of such components rather than multiple instances of such components. The variables N and M denoting respective numbers of network devices 102 and user devices 106 are therefore considered arbitrary integer values greater than or equal to one.

The network 104 is assumed to comprise a portion of a global computer network such as the Internet, although other types of networks can be part of the information processing system 100, including a wide area network (WAN), a local area network (LAN), a satellite network, a telephone or cable network, a cellular network such as a 4G or 5G network, a wireless network such as a WiFi, WiMAX, Bluetooth or near field communication (NFC) network, or various portions or combinations of these and other types of networks. The information processing system 100 in some embodiments therefore comprises combinations of multiple different types of networks each comprising processing devices configured to communicate using IP or other related communication protocols. Numerous alternative networking arrangements are possible in a given embodiment, as will be appreciated by those skilled in the art.

The network 104 illustratively comprises a plurality of network switches. These may include, for example, various types of routers, switch fabrics or other types of switching equipment, including in some embodiments management switches for carrying management traffic between the management servers 105 and the network devices 102. Such network switches are also considered examples of "network devices" as that term is broadly used herein. The network devices 102 in some embodiments comprise or are otherwise associated with one or more storage systems. Such storage systems can comprise any of a variety of different types of storage including by way of example network-attached storage (NAS), storage area networks (SANs), direct-attached storage (DAS) and distributed DAS, as well as combinations of these and other storage types, including but not limited to flash storage, storage arrays, software-defined storage, cloud storage and object-based storage.

The network devices 102 can comprise, for example, one or more host devices of a storage system of the type noted above, one or more storage nodes of a distributed storage system, and/or other types of physical or virtual nodes, although numerous other types and arrangements of network devices 102 are possible in a given embodiment. Again, network switches of the network 104 can also be considered "network devices" as that term is broadly used herein.

Although illustratively shown as being arranged internally to the network devices 102 in the illustrative embodiment of FIG. 1, the BMCs 114 in some embodiments can be arranged at least in part externally to their respective corresponding network devices 102. For example, a given one of the BMCs 114 can be implemented at least in part on a separate processing device coupled to its corresponding one of the network devices 102.

In some implementations of the system 100, a given one of the network devices 102 illustratively comprises a server or other compute node that can include one or more NICs, BMCs, storage devices and/or other components (e.g., infrastructure processing units (IPUs), data processing units (DPUs), BIOS components, NVMe components, etc.) Network device components such as smart NICs, IPUs and DPUs are examples of what are also referred to herein as "smart components" as such components generally have significant computational resources and associated memory.

Other types of network devices 102 can include additional or alternative components. For example, a storage array or other type of storage node can include storage controllers, storage devices, etc. A network switch can include, for example, a network operating system (OS), controllers, etc.

A wide variety of different types of device components can be used in other embodiments, such as embedded components or other types of components of a given network device. The term "device component" as used herein is therefore intended to be broadly construed.

In some embodiments, the network devices 102 implement respective management modules and/or respective management agents, illustratively utilizing processing logic 112 and/or BMCs 114. For example, the BMCs 114 illustratively implement respective management modules in some embodiments. A given such management module illustratively comprises or is implemented at least in part within a "management controller" as that term is broadly used herein. The management servers 105 can implement one or more cloud management portals, illustratively having associated vendor plug-ins for respective vendors associated with the network devices 102. as will be described in more detail elsewhere herein. Also, it is to be appreciated that additional or alternative components can be used in other embodiments.

In some embodiments, the BMCs 114 can be configured as the above-noted management modules for the respective network devices 102. For example, a BMC can be configured as a management module for a compute server. Additionally or alternatively, such management modules can be implemented at least in part utilizing the instances of processing logic 112 on the respective network devices 102.

For other types of network devices, such as network switches, a network OS and associated module of the network switch can be collectively configured to serve as a management module for the network switch.

Each of the management modules of the respective network devices 102 illustratively includes or otherwise has access to a key vault or other secure repository where keys and/or other related device component information are kept. For example, the BMCs 114 implemented on the network devices 102 can manage all associated keys and/or related device component information in a key vault or other secure repository in an encrypted manner. A network switch may be similarly configured to maintain a key vault or other secure repository where it may store keys, and/or related device component information. In some embodiments, the key vault of a network switch is configured to be relatively small compared to a key vault for a network device that includes a BMC, such as the network devices 102.

As indicated previously, in order to support management of diverse cloud infrastructure components, such as compute, storage and network components, management modules, illustratively interconnected by a management network, are commonly used. Problems can arise when an error scenario or other type of failure scenario adversely impacts at least one management module or its corresponding management network.

Infrastructure monitoring is critical for cloud and edge infrastructure. Today most of the monitoring is done using remote monitoring services and/or applications. For example, Azure monitor is used to monitor Azure-related infrastructure and its resources remotely.

For infrastructure monitoring, cloud or edge infrastructure components each typically have a designated monitoring service which continuously checks for health of the corresponding component in infrastructure and sends alerts based on the health state of the component. For example, in some implementations of cloud or edge infrastructure, a monitoring service of a BMC is responsible for monitoring and reporting health for one or more corresponding servers. The monitoring service in some embodiments is implemented as one of a plurality of microservices provided by the BMC.

If the monitoring service of a BMC goes down due to a failure or a corresponding remote monitoring agent doesn't receive an alert for some time, then there is no way to get the status or health report of the corresponding server in that infrastructure.

If there is no communication from a BMC or server host for some time, the monitoring service or management service can assume that the server is down or in an unresponsive state since there is no way to get the exact reason for a communication break.

The monitoring agent communicates with the BMC using a management path, such as an in-band or out-of-band management path, and for any communication with the server BMC, if the management path is broken then there is typically no effective way to communicate with the corresponding servers.

Many existing cloud infrastructure solutions utilize management appliances, illustratively implemented as respective virtual machines (VMs), and/or a dedicated management server for the infrastructure management. For example, VxRail includes a management appliance which uses an in-band connection to communicate with a BMC of a server. In case of heavy bandwidth utilization or security problems, if the management channel is broken then there is loss of connection with the BMC.

Azure stack hub uses an out-of-band channel to communicate with BMCs of respective cluster nodes. In case of failure, there is no way to find an alternate route to communicate with the BMCs.

There are other existing solutions which use a direct communication channel with a BMC of a given node, via an in-band or out-of-band arrangement, and such communication is of course no longer possible if the communication channel fails.

Illustrative embodiments disclosed herein overcome these and other drawbacks of conventional practice at least in part by creating a trusted component chain that can be used in a failure scenario relating to management functionality in cloud or edge infrastructure. For example, if the monitoring service on a BMC goes down then it switches to another component in the component chain to obtain a health report or other management-related information. As described in more detail below, this trusted component chain can be leveraged to create an alternate path for communication with the management controller in failure scenarios in which the original management channel is down.

These and other embodiments disclosed herein therefore address and overcome the above-described drawbacks of conventional approaches, by providing improved techniques for management of network devices in cloud infrastructure.

In the FIG. 1 embodiment, management techniques are illustratively implemented at least in part using the NICs 110, processing logic 112 and BMCs 114 of the respective network devices 102, and the management servers 105.

For example, in some embodiments, a given one of the network devices 102, such as the first network device 102-1, is illustratively configured to detect a failure impacting management functionality associated with a management controller of the first network device 102-1. Responsive to the detected failure being a failure of a first type, the first network device 102-1 addresses the detected failure utilizing at least one microservice replicated from the management controller to another component of the first network device 102-1. Responsive to the detected failure being a failure of a second type different than the first type, the first network device 102-1 addresses the detected failure by establishing an alternative management communication channel to one or more of the management servers 105 through at least one additional component of at least the first network device 102-1.

The management controller illustratively comprises at least a portion of the BMC 114-1 of the first network device 102-1, although other types and arrangements of management controllers can be used in other embodiments.

In some embodiments, the management controller comprises at least one controller pane implementing a main service of the management controller, and the management controller further comprises a plurality of microservices each provided under control of the main service of the controller pane. For example, the plurality of microservices illustratively comprises at least a monitoring service and one or more additional services including at least one of an update service, a configuration service, an authentication service and an inventory service, although other types and arrangements of microservices can be used.

The failure of the first type illustratively comprises a failure relating to at least one microservice of the management controller, and addressing the detected failure of the first type comprises activating a version of the microservice replicated to at least one of a host and a smart NIC of the first network device 102-1.

The failure of the second type illustratively comprises a failure of a connection in a management network through which the management controller of the first network device 102-1 communicates with one or more additional management controllers of one or more respective additional network devices. The management controllers further communicate over the management network with at least one monitoring agent of a cloud management portal. Such a cloud management portal is illustratively provided by one or more of the management servers 105 in system 100.

In some embodiments, addressing the detected failure of the second type illustratively comprises establishing the alternative management communication channel through at least one of a host and a smart NIC of the first network device 102-1.

The host illustratively comprises at least a portion of the processing logic 112-1 of the first network device 102-1, and the smart NIC illustratively comprises a particular one of the NICs 110-1 of the first network device 102-1.

As another example, in some embodiments, addressing the detected failure of the second type, or instead possibly a detected failure of a third type that is different than the second type, illustratively comprises establishing the alternative management communication channel through at least one of a host and a smart NIC of the first network device 102-1 and at least one of a host and a smart NIC of at least one other one of the network devices 102, illustratively second network device 102-2.

Accordingly, in some embodiments, the management controller of the first network device 102-1 communicates with a monitoring agent of a cloud management portal via the alternative management communication channel, with the alternative management communication channel comprising a management controller of the second network device 102-2, the host of the second network device 102-2, at least one network switch coupled between the first and second network devices, and the host of the first network device 102-1.

Numerous other arrangements of additional or alternative components of multiple ones of the network devices 102 can be used to establish a trusted component chain providing at least a portion of an alternative management communication channel to one or more of the management servers 105. For example, as indicated above, such an alternative management communication channel in other embodiments can include smart NICs and/or other smart components of one or more of the network devices 102.

In some embodiments, an authentication process is carried out between the first network device 102-1 and each of one or more additional network devices. The authentication process can comprise a single-factor authentication process or a multi-factor authentication process. Such an authentication process is illustratively utilized in forming at least portions of the above-noted trusted component chain between components of one or more network devices.

In implementing at least portions of the above-described high availability management functionality, the management controller of the first network device 102-1 identifies routes associated with packets of a plurality of different packet types processed by the first network device 102-1 and stores corresponding route information in a repository for use in addressing the detected failure.

For example, the packets of a first one of the different packet types illustratively comprise respective LLDP packets exchanged between the first network device 102-1 and one or more additional network devices.

Conventional aspects of LLDP packets are described in, for example, IEEE Standard 802.1AB-2016, "Station and Media Access Control Connectivity Discovery," January 2016, which is incorporated by reference herein in its entirety.

As another example, the packets of a second one of the different packet types illustratively comprise respective management packets exchanged between the management controller of the first network device 102-1 and at least one monitoring agent of a cloud management portal provided by one or more of the management servers 105. Additionally or alternatively, management packets may be exchanged between the management controller of the first network device 102-1 and one or more additional management controllers of one or more respective additional network devices 102. Such management packets are illustratively used to convey management information, possibly in encrypted form, between the network devices 102 and the management servers 105, and can be implemented using a wide variety of different packet formats and protocols.

As indicated previously, each of the network devices 102 is an example of what is more generally referred to herein as a "processing device." Other arrangements of at least one processing device can be configured to implement corresponding portions of the high availability management functionality disclosed herein. Individual components of the network devices 102, such as hosts, smart NICs and/or other smart components, may also be viewed as examples of "processing devices" as that term is broadly used herein.

The BMCs 114 are examples of what are more generally referred to herein as "management controllers" of the network devices. Other types and arrangements of management controllers can be used in other embodiments. Such management controllers are illustratively configured to carry out at least portions of the high availability management functionality disclosed herein.

As mentioned previously, the BMCs 114 of the respective network devices 102 are illustratively configured to communicate with one another. For example, the BMC 114-1 of the first network device 102-1 is illustratively configured to communicate with the BMC 114-2 of the second network device 102-2, and similar inter-BMC communication arrangements are assumed for each of the other BMCs 114 of the other network devices 102. Accordingly, each of one or more of the BMCs 114 is illustratively configured to communicate with one or more other ones of the BMCs 114, to facilitate high availability management for cloud infrastructure as disclosed herein.

In addition, as indicated above, each of the BMCs 114 is assumed to communicate with at least one of the management servers 105, illustratively via one or more management switches of the network 104.

In some embodiments, an LLDP packet payload may be configured to incorporate device component information sent by one of the BMCs 114 to another one of the BMCs 114. The term "device component information" as used herein is intended to be broadly construed, and may comprise any of a wide variety of different types of information characterizing one or more components of a given network devices. Other types of device component information packets can be used in other embodiments, and such embodiments are therefore not restricted to use of LLDP packets.

In some embodiments, the BMC 114-1 of the network device 102-1 is configured to exchange one or more LLDP packets or other types of device component information packets with one or more other ones of the BMCs 114 of one or more other ones of the network devices 102, such as with the BMC 114-2 of the network device 102-2. Each of the other BMCs 114 of respective ones of the other network devices 102 is similarly configured to support exchange of device component information packets.

Each of the network devices 102 may implement one or more management agents. For example, such management agents may be implemented within or otherwise in association with respective components of a given network device, such as host and/or smart NIC components of the given network device.

For example, a first network device illustratively comprises a first management agent that is configured to communicate with a second management agent of a second network device and with a cloud management portal. Such a cloud management portal is illustratively provided in system 100 by or in association with one or more of the management servers 105. These and other references herein to a first network device and a second network device can refer to any two of the network devices 102 and/or other network devices such as one or more network switches of the network 104.

Other types and arrangements of additional or alternative operations may be used in a management process in other embodiments.

The particular example functionality attributed to first and second network devices in the above description of illustrative embodiments can be similarly implemented in other pairs of the network devices 102, utilizing their respective instances of NICs 110, processing logic 112 and BMCs 114, as well as in other network devices of the system 100, such as network switches of the network 104.

It is to be appreciated that the particular set of system elements and other components and associated functionality as illustrated in the system 100 of the FIG. 1 embodiment is presented by way of example only, and a wide variety of alternative arrangements can be used in other embodiments. For example, at least portions of the functionality associated with components 110, 112 and 114 in other embodiments can be combined into a single component, or separated across a larger number of components.

It should also be noted that at least portions of the processing logic 112 of network devices 102 are illustratively implemented at least in part in the form of software comprising program code stored in memory and executed by a processor. Such processor and memory components in some embodiments are part of what is referred to herein as a "host" of a network device. A given such host can be viewed as an example of what is more generally referred to herein as a processing device.

An illustrative embodiment of an example process for high availability management for cloud infrastructure in the information processing system 100 will now be described in more detail with reference to the flow diagrams of FIG. 2.

This example process is illustratively carried out within a first network device and may involve interaction between the first network device and one or more additional network devices. These network devices may comprise two or more of the network devices 102 of system 100, with the example process of FIG. 2 illustratively utilizing these network devices and their corresponding instances of NICs 110, processing logic 112 and BMC 114, although additional or alternative system components may be used in other embodiments. It is also to be understood that this particular process is only an example, and additional or alternative processes can be carried out in other embodiments.

In step 200, a failure impacting management functionality associated with a management controller of a first network device is detected. Such failure detection functionality can be implemented, for example, at least in part in the management controller itself, such as a corresponding BMC, and/or in other components of the first network device, such as a host and/or a smart NIC. Associated processing logic within or outside such devices can additionally or alternatively be used to detect a particular failure and to determine one of a plurality of different failure types for the detected failure.

In step 202, responsive to the detected failure being a failure of a first type, the detected failure is addressed by utilizing at least one microservice replicated from the management controller to a host and/or a smart NIC of the first network device. For example, the failure of the first type illustratively comprises a failure relating to at least one microservice of the management controller, and addressing the detected failure of the first type illustratively comprises activating a version of the microservice replicated to at least one of a host and a smart NIC of the first network device. It is to be appreciated that other types of smart components of the first network device, such as a DPU or an IPU, can be used in addition to or in place of the host and/or the smart NIC in addressing the detected failure.

In step 204, responsive to the detected failure being a failure of a second type different than the first type, the detected failure is addressed by establishing an alternative management communication channel through the host and/or the smart NIC of the first network device. For example, the failure of the second type illustratively comprises a failure of a connection in a management network through which the management controller of the first network device communicates with at least one or more additional management controllers of one or more respective additional network devices.

In step 206, responsive to the detected failure being a failure of a third type, which may or may not be different than the failure of the second type, the detected failure is addressed by establishing an alternative management communication channel through (i) the host and/or the smart NIC of the first network device and (ii) a host and/or a smart NIC of a second network device. The failure of the third type may be a different type of failure in the management network, such as failure of a different connection or a different set of connections in the management network, or an entirely different type of failure. Numerous other types of failures can be detected and addressed using the disclosed techniques.

As indicated previously, in these and other embodiments disclosed herein, other types of smart components of the first and second network devices, such as a DPU or an IPU, can be used in addition to or in place of the host and/or the smart NIC.

The particular processing operations and other system functionality described in conjunction with the flow diagrams of FIG. 2 are presented by way of illustrative example only, and should not be construed as limiting the scope of the present disclosure in any way. Alternative embodiments can use other types of processing operations to implement high availability management for cloud infrastructure as disclosed herein. For example, certain steps may be performed at least in part concurrently with one another rather than serially. As additional examples, at least portions of the process steps may be repeated periodically for different management instances, between the same or different network devices, and multiple such instances can be performed in parallel with one another to implement management functionality for multiple distinct sets of network devices.

Also, functionality such as that described in conjunction with the flow diagrams of FIG. 2 can be implemented at least in part in the form of one or more software programs stored in program code of at least one memory and executed by at least one processor in one or more processing devices implementing a process for high availability management for cloud infrastructure as disclosed herein. A storage device or other memory having executable program code of one or more software programs embodied therein is an example of what is more generally referred to herein as a "processor-readable storage medium."

The foregoing example process is therefore illustrative only, and should not be viewed as limiting the scope of any particular embodiment in any way. Those skilled in the art will appreciate that numerous alternative arrangements for high availability management for cloud infrastructure can be used in other embodiments.

Additional illustrative embodiments of high availability management arrangements will now be described with reference to FIGS. 3 through 6. A given network device in these and other embodiments herein illustratively comprises one or more nodes, such as one or more physical nodes, one or more virtual nodes, and/or a combination of at least one physical node and at least one virtual node. The term "network device" as used herein can therefore encompass one or more nodes of various types. Additionally or alternatively, a network device can comprise a network switch.

Figure 3A:
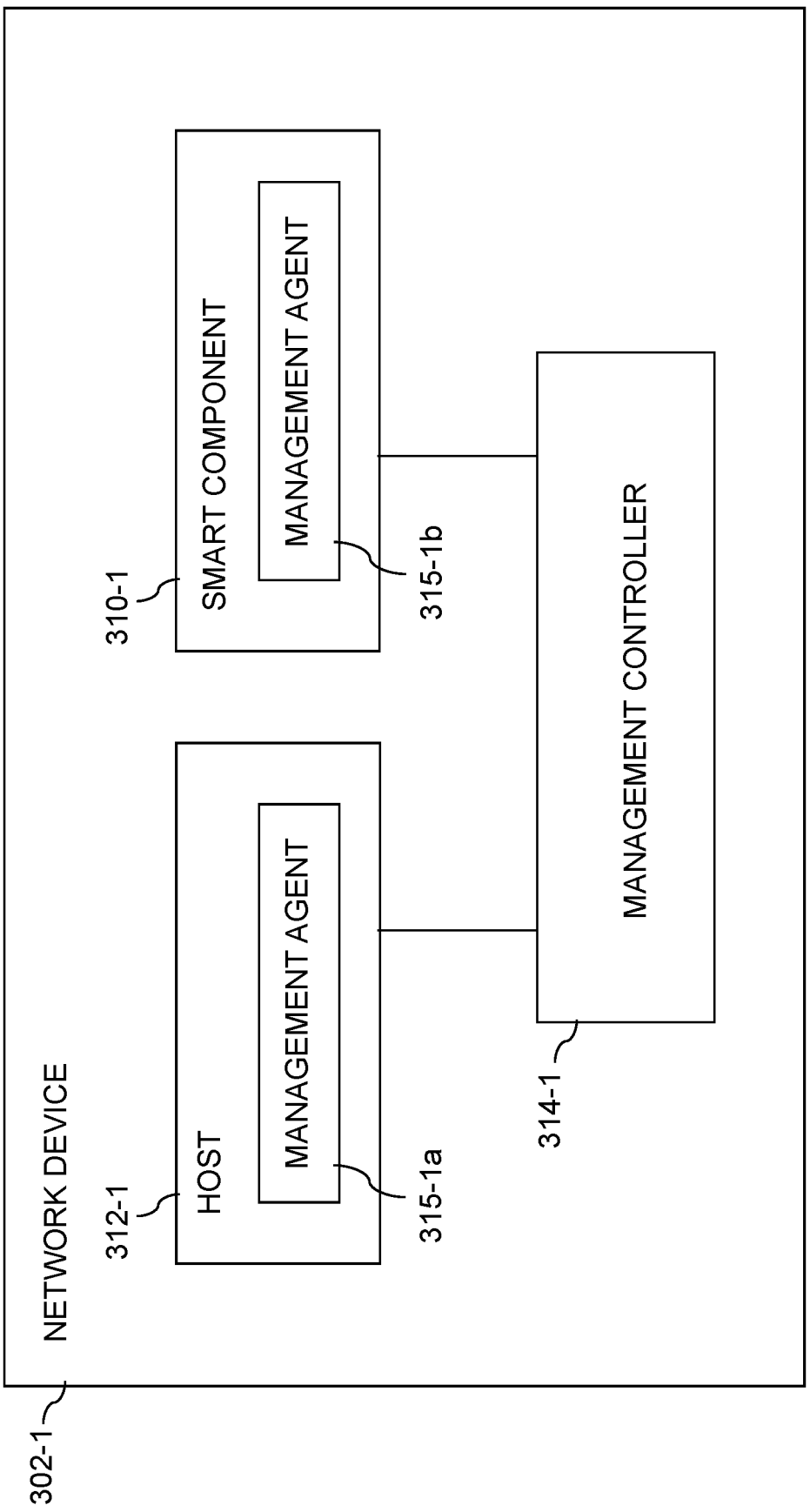
FIGS. 3A and 3B are block diagrams showing more detailed views of an example network device and its management controller in an illustrative embodiment. These figures are collectively referred to herein as FIG. 3.
Figure 3B:
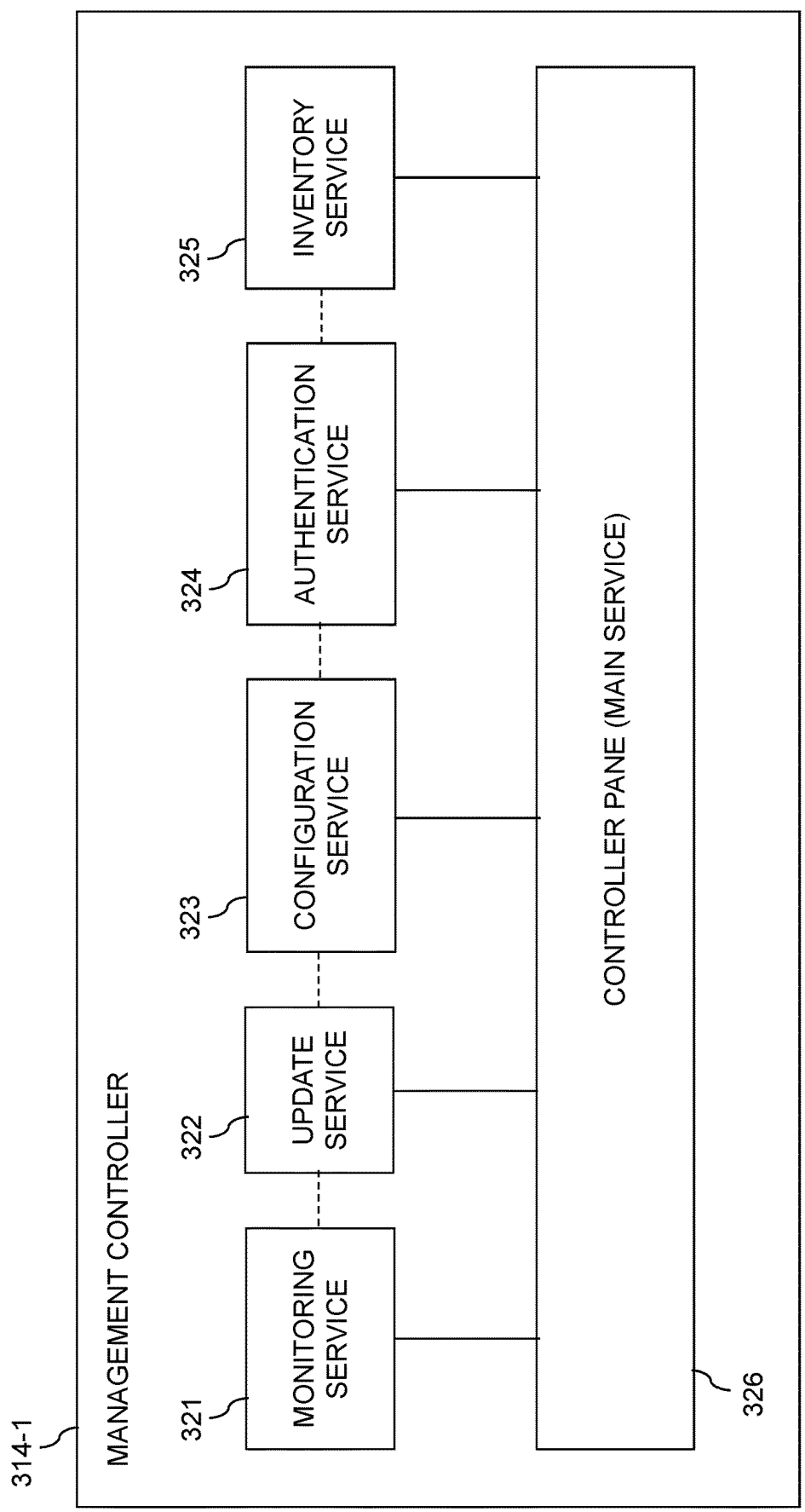

Referring now to FIG. 3, more detailed views are shown of an example network device and its management controller in an illustrative embodiment. As indicated previously, FIG. 3 includes separate portions denoted as FIG. 3A and FIG. 3B, with the former illustrating an example network device and the latter illustrating a management controller of that network device.

As shown in FIG. 3A, a network device 302-1 in this embodiment comprises a smart component 310-1, a host 312-1 and a management controller 314-1. The host 312-1 and the smart component 310-1 implement respective management agents 315-1a and 315-1b. The smart component 310-1 illustratively comprises a smart NIC, DPU or IPU. The management controller 314-1 illustratively comprises a BMC of the type described elsewhere herein.

FIG. 3B shows an example implementation of management controller 314-1. In this embodiment, the management controller 314-1 comprises a plurality of microservices, providing respective services 321 through 325, and a controller pane 326 implementing a main service of the management controller 314-1. The microservice-implemented services 321 through 325 more particularly include monitoring service 321, update service 322, configuration service 323, authentication service 324 and inventory service 325, each provided under control of the main service of the controller pane 326.

It is to be appreciated that the particular services 321 through 325 are presented by way of illustrative example only, and additional or alternative services can be implemented using respective microservices of the management controller 314-1 in other embodiments. Also, the components of the network device 302-1 and its management controller 314-1 can be varied in other ways in other embodiments.

The following example components are utilized in illustrative embodiments to implement portions of the disclosed high availability management functionality. Additional or alternative components having other configurations and/or functionality can be used in other embodiments. It is assumed that at least some of the network devices in these embodiments comprise respective servers.

Monitoring Agent

The monitoring agent is illustratively implemented at least in part as a service deployed at a cloud location and responsible for monitoring of one or more servers. For example, this management agent can be used to monitor one or more edge servers and/or one or more compute nodes deployed as part of cloud infrastructure. The management agent in some embodiments is implemented in a cloud management portal, as will be described in more detail below in conjunction with FIGS. 5 and 6. Such a cloud management portal is illustratively provided by one or more management servers, such as one or more of the management servers 105 of the system 100 of FIG. 1.

Management Controller

In some embodiments, the management controller is implemented as or otherwise comprises a BMC, although numerous other arrangements are possible. The management controller is responsible for all the management operations on the server such as monitoring, configuration, deployment, and other lifecycle management activities.

The management controller illustratively includes multiple containerized microservices which are responsible for multiple types of operation. For example, in some embodiments, there are separate microservices for the monitoring of hardware and for the configuration, and/or a main service which takes application programming interface (API) calls and requests, and sends the request to individual microservice for various operations. In case of failure/unresponsiveness of any of the microservices, the main service can generate a trigger on the client. An example implementation of such a management controller was described above in conjunction with the illustrative embodiment of FIG. 3, but as indicated previously, numerous other configurations can be used.

The management controller in some embodiments carries a vendor defined certificate which is illustratively used for any internal encrypted communication between vendor authorized components and devices.

The management controller also receives an LLDP packet from its corresponding connected neighbor devices. Thus, it obtains all the identity information of each such connected neighbor device.

The management controller pulls the LLDP packets received from all the network ports. The management controller can use its existing channel (e.g., Universal Serial Bus NIC (USB-NIC), Intelligent Platform Management Interface (IPMI), etc.), this includes all the smart components available on the corresponding server.

The management controller also comprises an intelligent route probe module which is illustratively responsible for probing the route for data packets, as mentioned previously.

This is illustratively done using all LLDP packets received from all devices connected to all the ports of the server. For example, one or more of the following may be used.

1. The BMC pulls LLDP packets from other ports by communicating with the host and one or more smart components.

2. The BMC check routes of management packets. This can be done by the BMC directly, illustratively operating in cooperation with the management agent.

3. The management agent talks to the host and smart components to get the details of the destination for each of the management packets. At least a portion of the resulting information is illustratively shared with the BMC using an existing channel.

4. If the BMC is directly connected to a management node, the BMC checks the route of the packet and maintains the route in its repository.

5. These routes and LLDP packets are illustratively used to ascertain and find alternate routes for management traffic.

6. The BMC also interacts with the network switches to get routes for management traffic.

Smart Component

A "smart component" as the term is broadly used herein illustratively includes various types of processor-based components available on one or more of the servers, such as, for example, a smart NIC, an IPU, a DPU, etc.

These components are illustratively connected using their own NIC ports or the regular network ports for external network connectivity.

These components are illustratively connected to the BMC using existing USB-NIC interfaces, Intelligent Platform Management Bus (IPMB) protocol and/or other types of connections.

These components carry a vendor-based certificate and corresponding private key for any internal encrypted communication between the components and the BMC.

The BMC creates a small reserve partition on a smart component that is illustratively used to host the management related microservice during a failover use case.

Copies of all critical microservices (e.g., health monitoring, inventory, etc.) are illustratively available on the smart component, or can be copied thereto on demand.

Management Agent

This is illustratively a vendor-specific agent carrying a vendor-based certificate and corresponding private key.

The management agent can be used as an intermediate agent between the host OS and the BMC, and can also be responsible for communication between the BMC and the smart component (e.g., smart NIC, DPU, IPU, etc.)

Communications between different components are encrypted using the vendor private key available on the agent, BMC or smart component.

The management agent is illustratively stored in the BMC and can be updated as part of a software update process of the server. Such a server in other embodiments can comprise another type of network device, such as a compute node.

The management agent can be pushed on-request, based on a request by the BMC, to the target component such as the host and/or smart component.

The management agent installed on the host and/or smart component shares LLDP packets and heartbeat information at regular intervals with the BMC.

Figure 4:
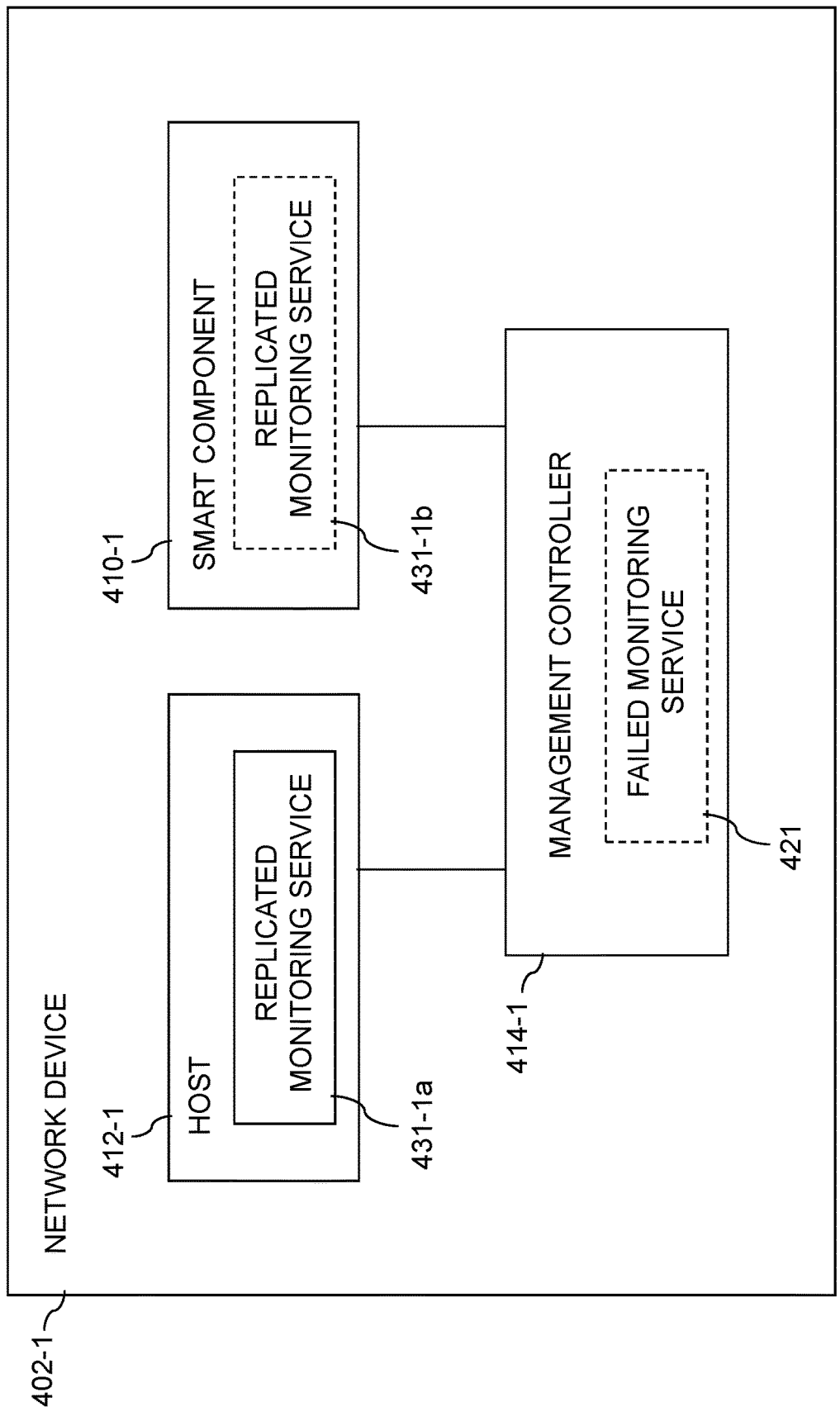
FIGS. 4, 5 and 6 show the manner in which high availability management is achieved for different failure types in illustrative embodiments.
Figure 5:
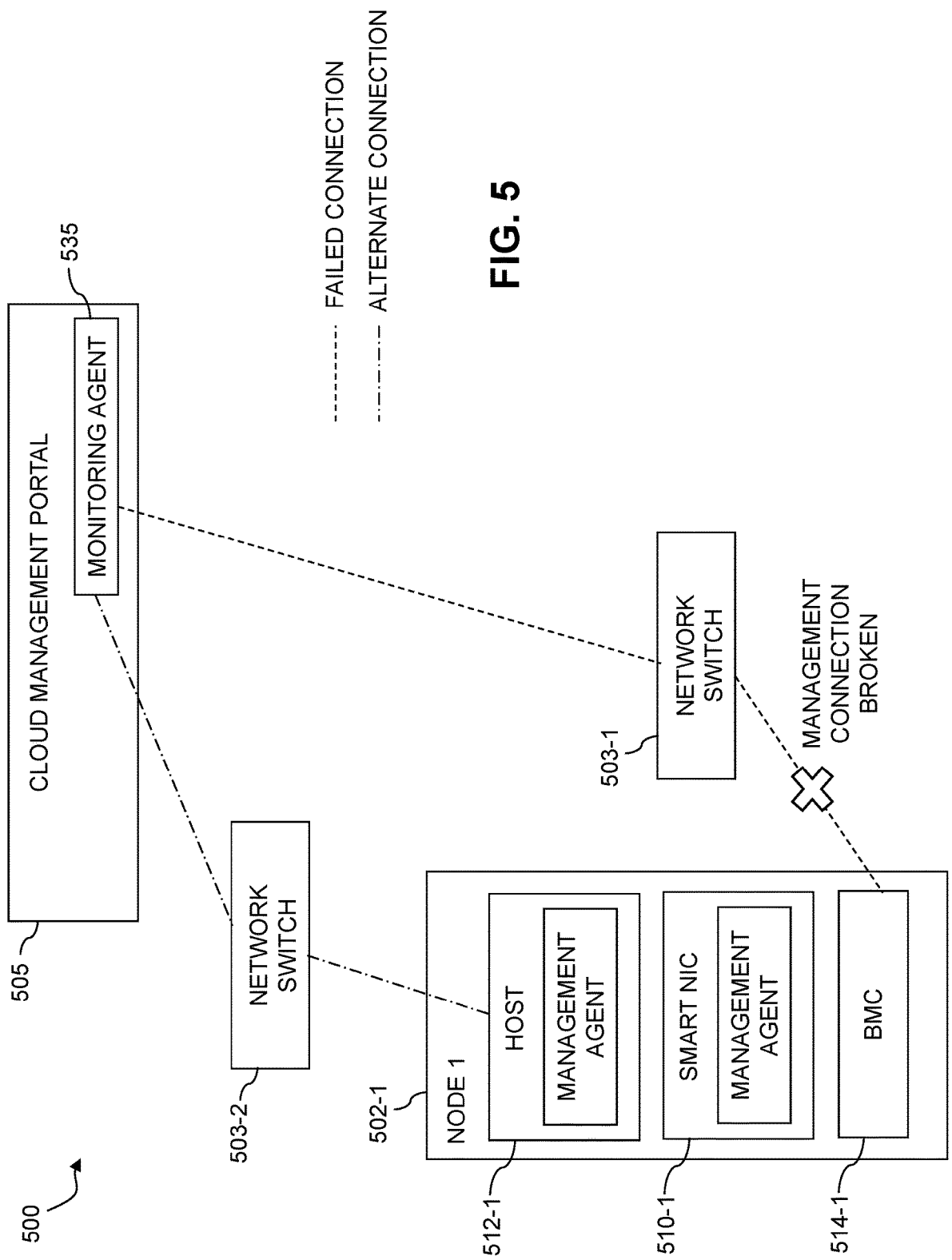
Figure 6:
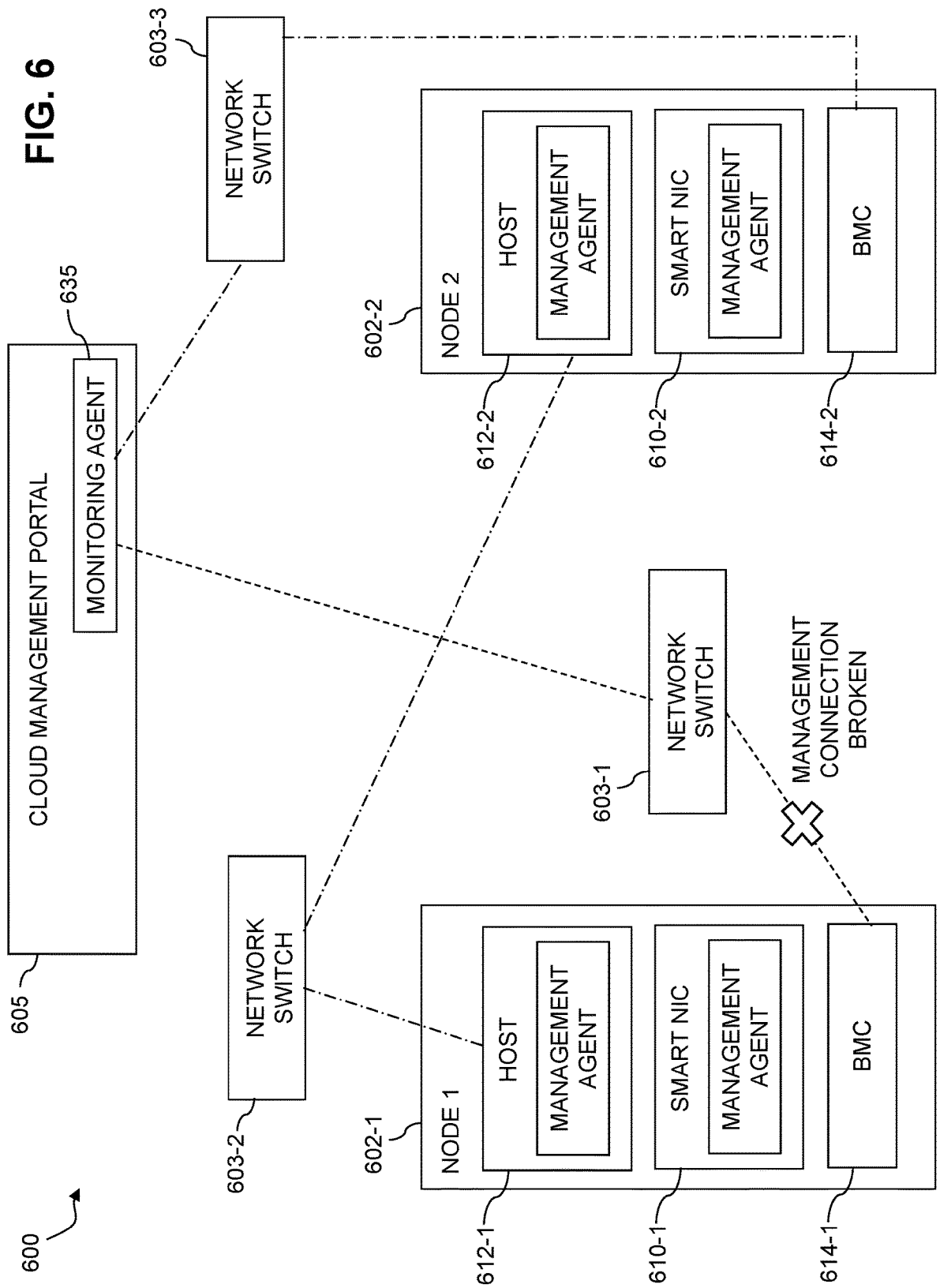

FIGS. 4, 5 and 6 show the manner in which high availability management is achieved for different failure types in illustrative embodiments, utilizing components such as one or more instances of each of the above-described monitoring agent, management controller, smart component and management agent.

Referring now to FIG. 4, a given network device 402-1 comprises a smart component 410-1, a host 412-1 and a management controller 414-1. The smart component 410-1 illustratively comprises a smart NIC, DPU or IPU, and the host 412-1 illustratively comprises processing logic as described previously. The management controller 414-1 illustratively comprises a BMC of the type described elsewhere herein, and implements a monitoring service 421, illustratively as one of a plurality of microservices provided by the management controller 414-1. The host 412-1 and the smart component 410-1 implement replicated instances of the monitoring service, denoted as respective replicated monitoring services 431-1a and 431-1b.

It is assumed in this example that the network device 402-1 has detected a failure impacting management functionality associated with the management controller 414-1 of the network device 402-1, and that the detected failure is of a first type, illustratively a failure relating to at least one microservice of the management controller 414-1, and more particularly relating to the monitoring service 421 of the management controller 414-1. The monitoring service 421 in this embodiment is therefore denoted as a failed monitoring service.

Responsive to detection of this failure, including the associated determination that the failure relates to the monitoring service 421 of the management controller 414-1, the network device 402-1 activates one of the replicated monitoring services 431-1a and 431-1b to replace the failed monitoring service 421. More particularly, in this example, the replicated monitoring service 431-1a deployed on the host 412-1 is activated to replace the failed monitoring service 421 of the management controller 414-1, and is therefore shown in solid outline in the figure. The failed monitoring service 421 of the management controller 414-1 and the other replicated monitoring service 431-b of the smart component 410-1 are each deactivated and therefore shown in dashed outline in the figure.

The replication of the monitoring service 421 of the management controller 414-1 to at least one of the host 412-1 and the smart component 410-1 illustratively occurs prior to the failure of the monitoring service 421. Alternatively, such replication can occur subsequent to detection of the failure.

The FIG. 4 embodiment is an example of an arrangement in which, responsive to a detected failure being a failure of a first type, the detected failure is addressed utilizing at least one microservice replicated from the management controller 414-1 to another component of the network device 402-1.

Numerous other types of failures can be detected in other embodiments, and the term "failure" as used herein is therefore intended to be broadly construed, so as to encompass, for example, a full or partial failure of a management-related component or service of the network device, as well as other similar conditions, such as the management-related component or service having an amount of load at or above a specified threshold value and/or an inability of the management-related component or service to perform at or above a specified threshold performance level. These and other types of failures impacting management functionality associated with a management controller are detected and addressed using the high availability management techniques disclosed herein.

FIGS. 5 and 6 illustrate other example failure scenarios, illustratively involving failures of one or more connections in a management network through which management controllers of respective network devices communicate with one another and with one or more management servers.

Referring now to FIG. 5, an information processing system 500 comprises a set of network devices including a first node 502-1, also denoted Node 1, and other nodes not explicitly shown in the figure. The system 500 further comprises network switches 503-1 and 503-2 through which the first node 502-1 communicates with a cloud management portal 505. Such network switches 503 are also considered "network devices" as that term is broadly used herein. A wide variety of additional or alternative arrangements of nodes, network switches and/or other network devices can be used in system 500.

The first node 502-1 comprises a smart NIC 510-1 and a host 512-1, each implementing a management agent of the type described elsewhere herein. The first node 502-1 further comprises a BMC 514-1. Each of the other nodes of the system 500 is assumed to be configured in a manner similar to that illustrated for node 502-1 in the figure.

The cloud management portal 505 implements a monitoring agent 535. The monitoring agent 535 interacts with the BMC 514-1 to provide management functionality for at least the first node 502-1. The monitoring agent 535 may be implemented at least in part utilizing one or more vendor plug-ins. Each such vendor plug-in contains a corresponding vendor certificate that may have an associated vendor public key.

The cloud management portal 505 illustratively implements a centralized management application for management of infrastructure such as nodes 502 and network switches 503 in the system 500.

A given one of the vendor plug-ins illustratively comprises a vendor management module or service provided by a vendor and made available on the cloud management portal 505 for any interaction with infrastructure. As indicated above, it can include a vendor certificate supporting one or more vendor keys. For example, the vendor certificate can be associated with a vendor public key, and the nodes 502 can have respective private vendor keys. Additionally or alternatively, shared vendor keys may be utilized by the nodes 502, such as one or more symmetric keys. These and other arrangements are intended to be encompassed by the term "vendor key" as that term is broadly used herein.

The management agents of the first node 502-1 illustratively serve as respective endpoints for management-related interactions, and possibly other types of interactions, between the first node 502-1 and similar management agents implemented on one or more other nodes of the system 500. Such management agents also support management-related interactions with the monitoring agent of the cloud management portal 505.

It is assumed in this example that the first node 502-1 has detected a failure impacting management functionality associated with the BMC 514-1 of the first node 502-1, and that the detected failure is of a second type, illustratively a failure of a connection in a management network through which the BMC 514-1 of the first node 502-1 communicates with monitoring agent 535 of the cloud management portal 505 and/or with one or more additional management controllers of one or more respective additional nodes.

Responsive to detection of this failure, including the associated determination that the failure relates to a management communication channel utilized by the BMC 514-1, the first node 502-1 establishes an alternative management communication channel through at least one of the host 512-1 and the smart NIC 510-1 of the first node 502-1. More particularly, in this example, the management connection between BMC 514-1 and network switch 503-1 is broken as a result of the failure in the connection of the management network, such that the BMC 514-1 can no longer communicate with the monitoring agent 535 via that connection.

Accordingly, the node 502-1 establishes an alternative management communication channel in which the BMC 514-1 communicates with the monitoring agent 535 via at least one of the smart NIC 510-1 and the host 512-1 and the network switch 503-2. For example, the BMC 514-1 can reach the network switch 503-2 via the host 512-1 and its corresponding management agent, possibly with additional involvement of the smart NIC 510-2 and its corresponding management agent.

The establishment of the alternative management communication channel between the BMC 514-1 via at least one of the host 512-1 and the smart NIC 510-1 in some embodiments occurs responsive to detection of the failure based at least in part on route information collected by the node 502-1 prior to the failure. Alternatively, in other embodiments such establishment of the alternative management communication channel can occur at least in part prior to detection of the failure.

The FIG. 5 embodiment is an example of an arrangement in which, responsive to a detected failure being a failure of a second type, the detected failure is addressed by establishing an alternative management communication channel through at least one additional component of at least the first node 502-1.

FIG. 6 shows another failure scenario that is addressed by establishing an alternative management communication channel through at least one additional component of at least a first node, but more particularly one in which the alternative management communication channel is established through a first node and a second node. Other embodiments can involve more than two nodes in the establishment of an alternative communication channel responsive to a detected failure of a particular type.

As illustrated in the figure, an information processing system 600 comprises a set of network devices including a first node 602-1, also denoted Node 1, and at least a second node 602-2, and possibly additional nodes not explicitly shown in the figure. The system 600 further comprises network switches 603-1, 603-2 and 603-3 arranged as shown, and a cloud management portal 605 comprising a monitoring agent 635.

The first node 602-1 comprises a smart NIC 610-1 and a host 612-1, each implementing a management agent of the type described elsewhere herein, and further comprises a BMC 614-1. Similarly, the second node 602-2 comprises a smart NIC 610-2 and a host 612-2, each implementing a management agent of the type described elsewhere herein, and further comprises a BMC 614-2. Any additional nodes of the system 600 are assumed to be configured in a manner similar to that illustrated for nodes 602-1 and 602-2 in the figure. Such nodes in illustrative embodiments herein are also referred to as a cluster of nodes, or a node cluster. As disclosed herein, an alternative management communication channel in some embodiments can involve multiple nodes of a node cluster.

Each of the nodes 602, network switches 603 and cloud management portal 605 operate in a manner similar to that previously described for analogous components of the system 500 of FIG. 5. However, in this embodiment, responsive to detection of a failure comprising a broken management connection between BMC 614-1 and network switch 603-1, an alternative management communication channel is established between the BMC 614-1 and the cloud management portal 605 utilizing components of both the first node 602-1 and the second node 602-2. More particularly, in this embodiment, the alternative management communication channel is established through at least host 612-1 and possibly also smart NIC 610-1 of the first node 602-1 and at least host 612-2 possibly also smart NIC 610-2 of the second node 602-1, illustratively via their respective management agents. The alternative management communication channel in this embodiment allows BMC 614-1 of first node 602-1 to communicate with BMC 614-2 of second node 602-2 via network switch 603-2, and thereby also allowing BMC 614-1 to communicate with monitoring agent 635 of cloud management portal 605 via BMC 614-2 and network switch 603-3.

The particular types and arrangements of alternative management communication channels illustrated in the embodiments of FIGS. 5 and 6 are examples only, and numerous other types of channels can be used in other embodiments. The term "alternative management communication channel" as used herein is therefore intended to be broadly construed so as to encompass, for example, alternate paths or other types of alternative connections between system components, such as between nodes or other network devices and/or between a given node or other network device and at least one management server.

Example workflows in failure scenarios such as those illustrated in FIGS. 4, 5 and 6 will now be described in more detail, although it is to be appreciated that additional or alternative processes and operations can be used in other embodiments. These workflows may be viewed as respective algorithms implemented by one or more nodes or other network devices and their associated components in a given system.

Service Replication During Failover Scenario

1. BMC communicates with other smart components on encrypted channel, where the packet is illustratively encrypted at either end using vendor key available on the component.

2. BMC and management agent on host and smart component monitor heartbeat of BMC and its services.

(a) Management agent monitors the health of BMC, to determine if it is alive or not.

(b) BMC creates a hash of all the services which is illustratively sent to management agent during boot process and/or during onboarding of management agent.

(c) If there is any change in service, BMC updates the management agent with a new hash.

(d) Management agent polls and/or subscribes for any trigger from BMC. If any of the services go down, a new hash is illustratively calculated and pushed to the management agent.

3. BMC checks for the health and load on the different microservices and determines whether or not there is excessive load (e.g., load at or above a specified threshold value). For example, BMC can fetch load information of the host and smart component using the existing channel (e.g., USB-NIC, IPMI). Priority is illustratively provided for host and smart components that can be set, for example, using a web graphical user interface (GUI) of BMC or an API.

(a) BMC copies the microservice to one or more other smart components temporarily, and starts the service, here all the requests are illustratively redirected to the copied microservice.

(b) The microservice moved to the one or more smart components communicates with BMC for hardware inventory and health.

(c) The microservice available on the BMC goes into hibernation mode.

4. At least a portion of the data from the repository is illustratively copied to the smart component and has dual reference, for example, with a first instance maintained on the BMC and the other instance being on the smart component.

5. For all the hardware and other microservice-related communication, the microservice on smart component communicates with the microservice available on BMC.

6. If the service replication fails, management agent sends that information to BMC and sends a trigger to re-initiate the copy of the microservice.

Alternate Path Creation During Management Communication Failure

1. BMC checks for connection with all its neighbor devices using the LLDP packets received from the connected management network port or any other network port connected to smart devices, illustratively at regular intervals.

2. If there is no LLDP information available from management channel:

(a) BMC tries to find alternate path for management communication. For example, BMC checks the LLDP packets from other network ports (e.g., connected to host or smart component), and if a given such LLDP packet includes information about the management node, BMC informs the management agent installed on the component (e.g., host or smart component) to route the management packet.

(b) If smart component or host is connected to target management device, BMC transfers packet to smart component or host.

(c) The management packet is illustratively rerouted thorough the alternate component such as smart component or host. This may involve changing one or more settings, such as a network access control list (ACL) setting.

Management Channel Using Neighbor Device in Cluster

If the server or other network device is part of a node cluster and management channel is down, then BMC uses the following method to find an alternate path for transfer of a management packet.

1. BMC checks old LLDP packets from history maintained in its repository.

2. If there is a drop of an LLDP packet from a neighbor, BMC tries to find the alternate path.

3. BMC tries to find the neighbor device using the LLDP packet received from other network ports connected to host or smart component. The neighbor device illustratively comprises a node.

4. BMC checks if the node is part of cluster, and for this it pulls information from host OS using existing channel. Such a node that is part of a cluster is also referred to as a neighbor cluster node.

5. BMC probes for the neighbor device (e.g., a server or other network device), which is connected to the management node using the other ports. This can be deduced using the LLDP packet, which illustratively contains identity information of only the neighbor device, which as indicated above is also referred to as a neighbor cluster node.

6. BMC pushes a management agent to host or smart component.

7. BMC sends the management packet to the management agent with instruction to forward it to the neighbor cluster node. The management packet is illustratively encrypted using vendor private key available on BMC.

8. Management agent is illustratively responsible for sending packet to neighbor cluster node. Management agent uses the other port of system connected to host or smart component to send packet to neighbor cluster node.

9. The neighbor cluster node receives the packet and the management agent tags the packet with identity information of source node.

10. The packet is sent to BMC of neighbor cluster node.

11. Receiving BMC decrypts the packet using the vendor private key.

12. Neighbor cluster node sends packet to management server and sends a notification to redirect the communication using new route.

In some embodiments using the above-described workflow, after establishing the connection for management traffic using an alternate route, the management server or monitoring agent is illustratively able to obtain a more specific reason for the disconnection or break of management path, as the BMC is illustratively able to send a packet with error details and with the change of management path.

The particular example workflows and their associated operations as described above and illustrated in FIGS. 4 through 6 should not be construed as limiting in any way, and can be varied in other embodiments.

Again, the above-described processes and other features and functionality disclosed herein are presented by way of illustrative example only, and other embodiments can utilize additional or alternative arrangements.

As indicated previously, illustrative embodiments provide a number of significant advantages relative to conventional arrangements.

For example, some embodiments provide techniques for high availability management for cloud infrastructure.

More particularly, illustrative embodiments provide systems, methods, apparatus and computer program products for improved management of cloud infrastructure, particularly in failure scenarios or other situations that adversely impact high availability.

For example, some embodiments provide an alternate management channel for a failed management network channel on a server BMC without any additional network changes.

Some embodiments are configured to use smart components (e.g., smart NIC, IPU, DPU, etc.) of one or more network devices to implement a management communication channel between a BMC and a management server and/or between two BMCs in a clustered environment.

Additionally or alternatively, some embodiments are configured to utilize smart components (e.g., smart NIC, IPU, DPU, etc.) to monitor and restart unhealthy and/or abruptly shut down services on the BMC.

In the event of a failure of a management channel for a given cluster node, some embodiments are configured to utilize an alternate management path via another cluster node.

Some embodiments are configured to diagnose a cause of a failure in a management communication channel.

Additionally or alternatively, some embodiments provide secure and trusted communication between a host OS agent and an out-of-band management agent.

These and other embodiments provide improved management of cloud infrastructure, thereby facilitating seamless customer experience and troubleshooting of error scenarios in cloud and edge infrastructure. For example, some embodiments allow infrastructure management even in error scenarios in which a management controller and/or a management network is down.

Some embodiments can be used for an edge category of devices where a BMC implemented on an edge device and a corresponding smart NIC are utilized to orchestrate aspects of the disclosed functionality.

Additionally or alternatively, illustrative embodiments can be used to facilitate secure management in an HCI cluster and in numerous other types and arrangements of cloud infrastructure.

The disclosed techniques can be advantageously deployed in a wide variety of different computer networks or other information processing system arrangements, such as cloud infrastructure, cluster infrastructure or other deployments of IT infrastructure.

Some embodiments disclosed herein provide systems and methods that are agnostic to the particular network topology in the IT infrastructure.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement processing devices with high availability management functionality will now be described in greater detail with reference to FIGS. 7 and 8. Although described in the context of system 100, these platforms may also be used to implement at least portions of other information processing systems in other embodiments, such as system 500 and/or system 600.

Figure 7:
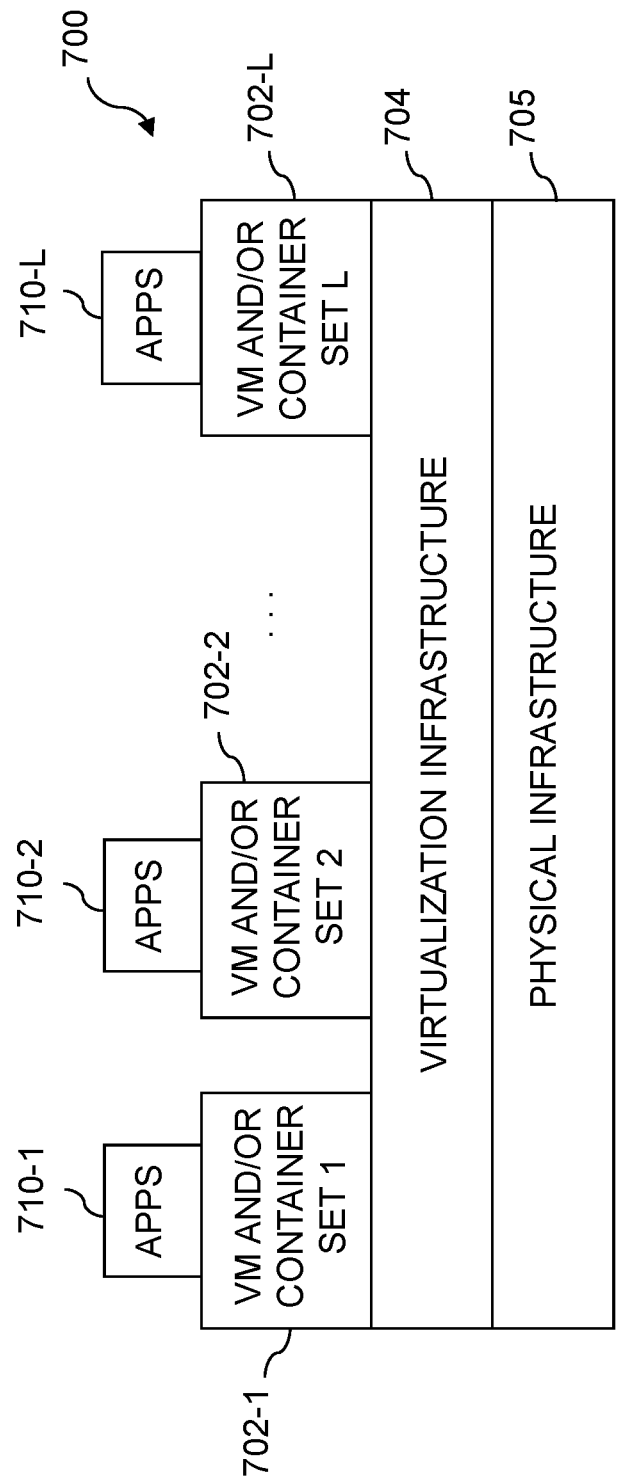
FIGS. 7 and 8 show examples of processing platforms that may be utilized to implement at least a portion of an information processing system in illustrative embodiments.
Figure 8:
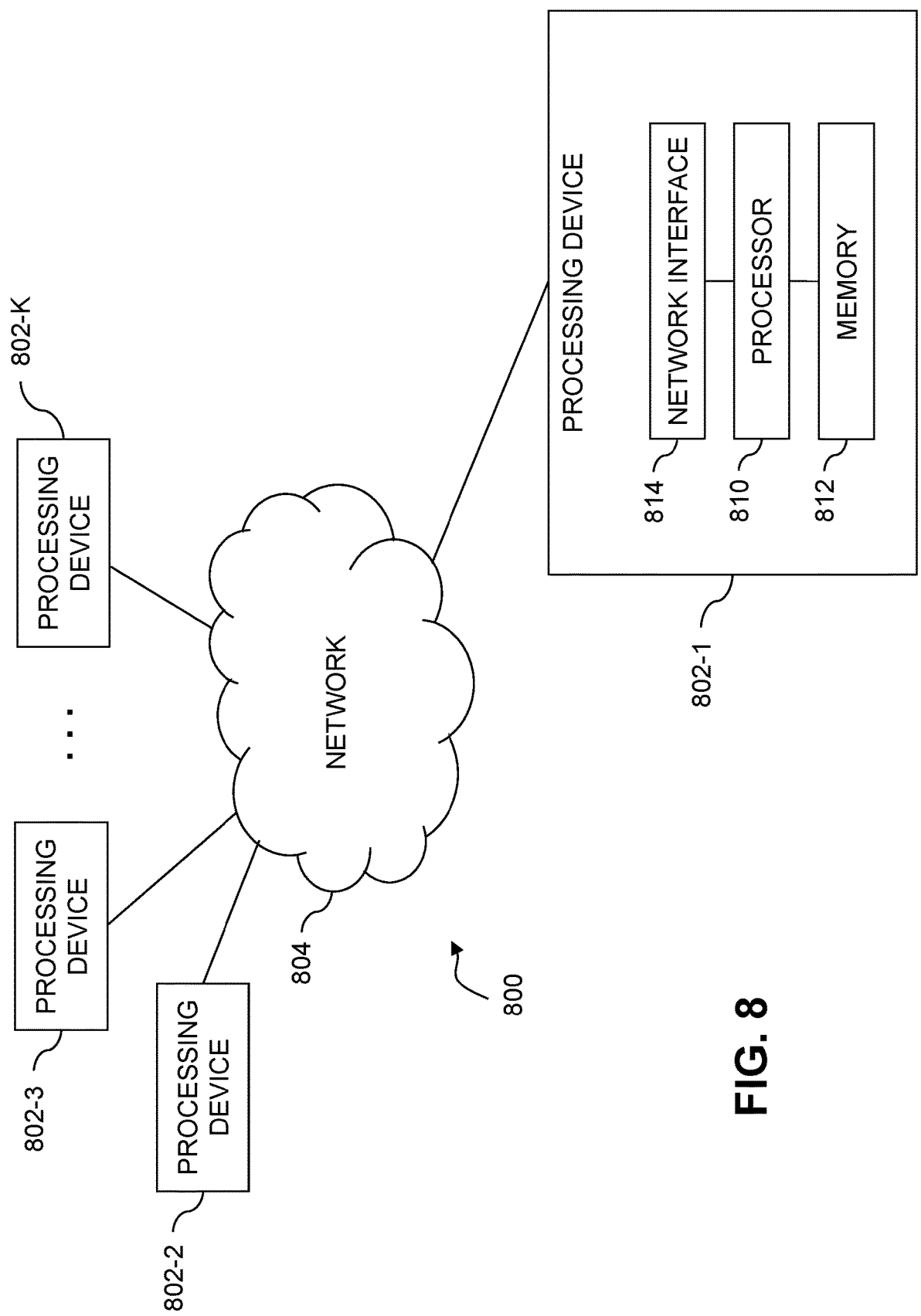

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide at least portions of the disclosed high availability management functionality in an information processing system of the type described above using one or more processes running on a given one of the VMs. For example, each of the VMs can implement logic instances and/or other components providing high availability management functionality in the system 100.

A hypervisor platform may be used to implement a hypervisor within the virtualization infrastructure 704. Such a hypervisor platform may comprise an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can also provide at least portions of the disclosed high availability management functionality in an information processing system of the type described above. For example, a container host device supporting multiple containers of one or more container sets can implement logic instances and/or other components providing high availability management functionality in the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments.

A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the high availability management functionality provided by one or more components of an information processing system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, networks, network devices, servers, controllers and additional or alternative components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   wherein the at least one processing device is configured:
   to detect a failure impacting management functionality associated with a management controller of a first network device;
   responsive to the detected failure being a failure of a first type, to address the detected failure utilizing at least one microservice replicated from the management controller to another component of the first network device; and
   responsive to the detected failure being a failure of a second type different than the first type, to address the detected failure by establishing an alternative management communication channel through at least one additional component of at least the first network device.

2. The apparatus of claim 1 wherein the at least one processing device comprises at least a portion of the first network device.

3. The apparatus of claim 1 wherein the management controller comprises a baseboard management controller.

4. The apparatus of claim 1 wherein the management controller comprises at least one controller pane implementing a main service of the management controller and wherein the management controller further comprises a plurality of microservices each provided under control of the main service of the controller pane.

5. The apparatus of claim 4 wherein the plurality of microservices comprises at least a monitoring service and one or more additional services including at least one of an update service, a configuration service, an authentication service and an inventory service.

6. The apparatus of claim 1 wherein the failure of the first type comprises a failure relating to at least one microservice of the management controller, and addressing the detected failure of the first type comprises activating a version of the microservice replicated to at least one of a host and a smart network interface card of the first network device.

7. The apparatus of claim 1 wherein the failure of the second type comprises a failure of a connection in a management network through which the management controller of the first network device communicates with at least one or more additional management controllers of one or more respective additional network devices.

8. The apparatus of claim 7 wherein the management controllers further communicate over the management network with at least one monitoring agent of a cloud management portal.

9. The apparatus of claim 7 wherein addressing the detected failure of the second type comprises establishing the alternative management communication channel through at least one of a host and a smart network interface card of the first network device.

10. The apparatus of claim 7 wherein addressing the detected failure of the second type comprises establishing the alternative management communication channel through at least one of a host and a smart network interface card of the first network device and at least one of a host and a smart network interface card of a second network device.

11. The apparatus of claim 10 wherein the management controller of the first network device communicates with a monitoring agent of a cloud management portal via the alternative management communication channel, the alternative management communication channel comprising a management controller of the second network device, the host of the second network device, at least one network switch coupled between the first and second network devices, and the host of the first network device.

12. The apparatus of claim 1 wherein the management controller of the first network device identifies routes associated with packets of a plurality of different packet types processed by the first network device and stores corresponding route information in a repository for use in addressing the detected failure.

13. The apparatus of claim 12 wherein the packets of a first one of the different packet types comprise respective Link Layer Discovery Protocol (LLDP) packets exchanged between the first network device and one or more additional network devices.

14. The apparatus of claim 12 wherein the packets of a second one of the different packet types comprise respective management packets exchanged between the management controller of the first network device and at least one of (i) one or more additional management controllers of one or more respective additional network devices, and (ii) at least one monitoring agent of a cloud management portal.

15. A computer program product comprising a non-transitory processor-readable storage medium having stored therein program code of one or more software programs, wherein the program code when executed by at least one processing device causes the at least one processing device:
to detect a failure impacting management functionality associated with a management controller of a first network device;
responsive to the detected failure being a failure of a first type, to address the detected failure utilizing at least one microservice replicated from the management controller to another component of the first network device; and
responsive to the detected failure being a failure of a second type different than the first type, to address the detected failure by establishing an alternative management communication channel through at least one additional component of at least the first network device.

16. The computer program product of claim 15 wherein the failure of the first type comprises a failure relating to at least one microservice of the management controller, and addressing the detected failure of the first type comprises activating a version of the microservice replicated to at least one of a host and a smart network interface card of the first network device.

17. The computer program product of claim 15 wherein the failure of the second type comprises a failure of a connection in a management network through which the management controller of the first network device communicates with at least one or more additional management controllers of one or more respective additional network devices.

18. A method comprising:
detecting a failure impacting management functionality associated with a management controller of a first network device;
responsive to the detected failure being a failure of a first type, addressing the detected failure utilizing at least one microservice replicated from the management controller to another component of the first network device; and
responsive to the detected failure being a failure of a second type different than the first type, addressing the detected failure by establishing an alternative management communication channel through at least one additional component of at least the first network device;
wherein the method is performed by at least one processing device comprising a processor coupled to a memory.

19. The method of claim 18 wherein the failure of the first type comprises a failure relating to at least one microservice of the management controller, and addressing the detected failure of the first type comprises activating a version of the microservice replicated to at least one of a host and a smart network interface card of the first network device.

20. The method of claim 18 wherein the failure of the second type comprises a failure of a connection in a management network through which the management controller of the first network device communicates with at least one or more additional management controllers of one or more respective additional network devices.

* * * * *